US006454555B1

(12) United States Patent
Kierbel et al.

(10) Patent No.: US 6,454,555 B1
(45) Date of Patent: *Sep. 24, 2002

(54) APPARATUS FOR MAKING AN ANNULAR FRICTION LINER

(75) Inventors: David Kierbel, Caen; Loïc Adamczak, Montsecret; Cécile Rommeru, Limoges; Claude Legrand, Conde sur Noireau, all of (FR)

(73) Assignee: Valeo, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,738

(22) Filed: Mar. 14, 2000

Related U.S. Application Data

(62) Division of application No. 09/020,211, filed on Feb. 6, 1998, now Pat. No. 6,036,903.

(30) Foreign Application Priority Data

Feb. 7, 1997 (FR) .............................................. 97 01530

(51) Int. Cl.[7] .................... B29C 43/26; B29C 43/46; B29C 53/12; B29C 53/72
(52) U.S. Cl. .................... 425/302.1; 425/307; 425/315; 425/365; 425/366
(58) Field of Search .............................. 264/138, 145, 264/151, 165, 177.17, 210.1, 210.2, 211.12, 280, 285, 291, 294, 295, 339; 425/307, 315, 365, 366, 302.1; 156/217

(56) References Cited

U.S. PATENT DOCUMENTS

| 1,643,999 | A | | 11/1927 | Semple | |
|---|---|---|---|---|---|
| 2,061,919 | A | | 11/1936 | Nanfeldt | 188/250 R |
| 2,327,706 | A | | 8/1943 | Halstead | 264/285 |
| 2,838,405 | A | | 6/1958 | Huckfeldt | 264/285 |
| 3,019,457 | A | * | 2/1962 | Smith | |
| 3,885,899 | A | | 5/1975 | Gurta et al. | 425/150 |
| 4,260,047 | A | | 4/1981 | Nels | 192/76.14 |
| 4,265,607 | A | * | 5/1981 | Klay | 425/113 |
| 4,470,555 | A | | 9/1984 | Lawson | 242/56.2 |
| 4,554,713 | A | | 11/1985 | Chabal | 26/51 |
| 4,605,527 | A | | 8/1986 | Kamiura et al. | 264/137 |
| 4,882,006 | A | | 11/1989 | Seki | 156/504 |

FOREIGN PATENT DOCUMENTS

| EP | 625 647 | | 11/1994 | |
|---|---|---|---|---|
| FR | 2 607 886 | | 6/1998 | |
| JP | 02-251657 A | * | 10/1990 | D04H/1/70 |
| WO | 95/26473 | | 10/1995 | |

OTHER PUBLICATIONS

French Search Report dated Oct. 21, 1997.

* cited by examiner

*Primary Examiner*—Jan H. Silbaugh
*Assistant Examiner*—Michael I. Poe
(74) *Attorney, Agent, or Firm*—Morgan & Finnegan, LLP

(57) ABSTRACT

An annular friction liner, especially for use in a friction device of a motor vehicle, is made by an apparatus including a pair of adjacent conical rolls, a helical guide and a device for trimming a length of the continuous ring whereby a straight strip of friction material, having a width substantially equal to the required final width of the liner, is deformed into a continuous ring.

4 Claims, 2 Drawing Sheets

APPARATUS FOR MAKING AN ANNULAR FRICTION LINER

This application is a divisional of prior U.S. Application Ser. No. 09/020,211 filed on Feb. 6, 1998, now U.S. Pat. No. 6,036,903.

FIELD OF THE INVENTION

The present invention relates to a method of making an annular friction liner. More particularly, the invention relates to a friction liner in the form of an annular ring, which is either flat or in the form of a frustum of a cone. The device which is equipped with this liner is a clutch friction wheel or a disc brake, especially for an automatic gearbox associated therewith and typically operating in oil. Another application is that of a synchronising ring or cone in a manual gearbox, again typically working in oil. In general, such devices are part of a motor vehicle.

The invention relates especially to the manufacture of a friction liner of the type which is made from a friction material consisting of a mat of fibres impregnated with a thermosetting resin, such as is described in U.S. Pat. No. 5,807,518.

BACKGROUND OF THE INVENTION

Various ways of making a flat annular friction liner are known, which include the steps of cutting out the friction liner either in one piece or in sections, but these methods involve excessively high, and costly, wastage.

DISCUSSION OF THE INVENTION

In order to overcome this disadvantage, the invention, in a first aspect, provides a method of making a friction liner of generally annular form, characterised in that it consists in:
forming a straight strip of friction material having a width which is substantially equal to the required final width of the friction liner; and then
deforming the straight strip so as to configure the latter into a continuous annular ring.

The method preferably further includes receiving the strip of friction material, after the latter has been configured into a curved form, in a guide of complementary form.

The method preferably further consists in simultaneously trimming the circular edges of the annular strip after the latter has been configured into its circular configuration, so as to give an annular strip of constant predetermined width.

The method preferably further consists in cutting a sector of the annular strip after the latter has been configured into its circular form, the said sector, corresponding to one complete circumference, followed by the further step of joining together the adjacent ends of the strip.

According to a preferred feature of the invention, the straight strip of friction material is deformed into its curved form by passing it between two adjacent conical rolls with intersecting axes.

Preferably, the straight strip of friction material is made from a friction material which is adapted for equipping a friction device, and more particularly a clutch friction wheel or brake disc, the material consisting of a mat of fibres impregnated with a thermosetting resin.

More particularly, the friction material is preferably of a kind adapted for equipping a friction device working in a liquid medium, and more particularly a device such as a clutch friction wheel or brake disc, especially for an automatic gearbox or, associated therewith, a synchronising ring or cone of a manual gearbox.

The friction liner is an annular liner which may be flat or frusto-conical.

According to the invention in a second aspect, a generally annular friction liner is characterised in that it is made by a method according to the invention in its first aspect.

According to the invention in a third aspect, apparatus is provided for performing the method of the invention. The apparatus being characterised in that it includes a deformation or configuring station at which the straight strip of friction material is configured into its curved form. The configuring station comprising two adjacent conical rollers having intersecting axes which lie in a common plane at right angles to the plane in which the straight strip of friction material is advanced between the conical rolls.

The apparatus according to the invention preferably includes, upstream of the configuring station, a longitudinal tensioning station which comprises two cylindrical rolls having parallel axes lying in a common plane at right angles to the plane in which the straight strip of friction material is advanced between the cylindrical rolls.

Further features and advantages of the invention will appear more clearly on a reading of the following detailed description of some preferred embodiments of the invention, which are given by way of non-limiting example only and with reference to the accompanying drawings.

DESCRIPTION OF PREFERRED EMBODIMENTS OF THE INVENTION

Figure 1:
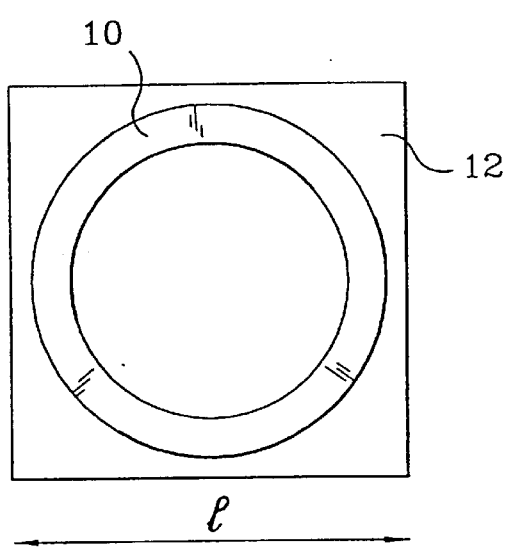
FIG. 1 is a diagram showing a first method of making a friction liner, in accordance with the state of the art.

Reference is first made to FIG. 1, which shows a blank for a friction liner 10 of generally annular form. The blank is made by pressing out an endless annular shape from a strip 12 of friction material, which is for example a mat of fibres impregnated with a thermosetting resin. For more details of the structure, composition and manufacture of this base material, reference is invited to the description in U.S. Pat. No. 5,807,518.

As can be seen in FIG. 1, this particular known technique necessitates the provision of a strip of material 12 having a width l which is at least equal to the external diameter of the friction liner stamped out of the strip. Accordingly, wastage resulting from the operation whereby the blank for the friction liner is pressed out, is extremely high.

Figure 2:
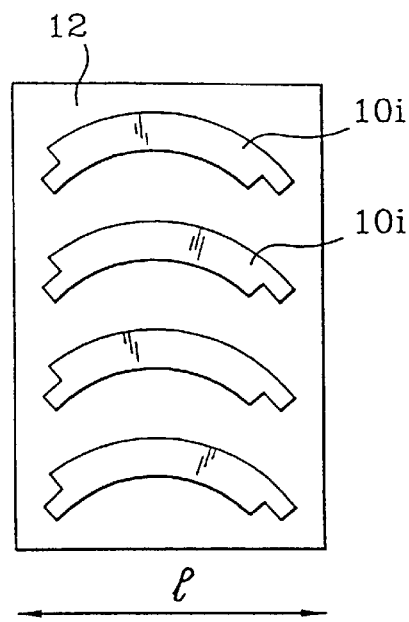
FIG. 2 is a diagram showing a second method of making a friction liner in accordance with the state of the art.

In an attempt to reduce this wastage of friction material, it has been proposed to adopt the technique illustrated in FIG. 2, in which each liner blank is made in the form of several pieces 10i, of which there may typically be four for each circular liner. After these pieces 10i have been pressed out on the strip of material 12, wastage is reduced as compared with the technique shown in FIG. 1, and in addition the width l necessarily is reduced. However, it is then necessary to assemble the four pieces of liner material together by joining them together so as to create the annular blank.

In both cases (FIGS. 1 and 2), the blank is then subjected to the usual moulding and curing operations.

Figure 3:
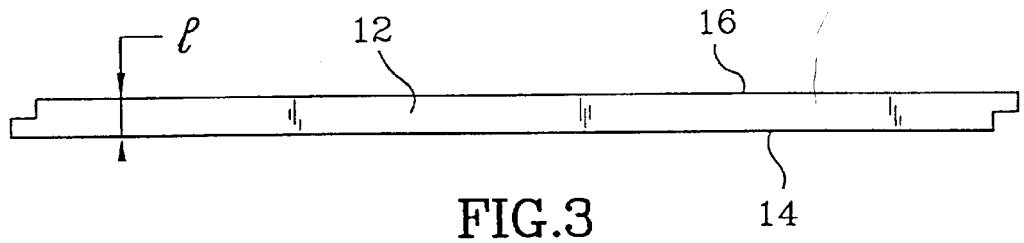
FIG. 3 is a diagram showing a straight strip of friction material, used in the performance of the method in accordance with the features of the present invention.
Figure 4:
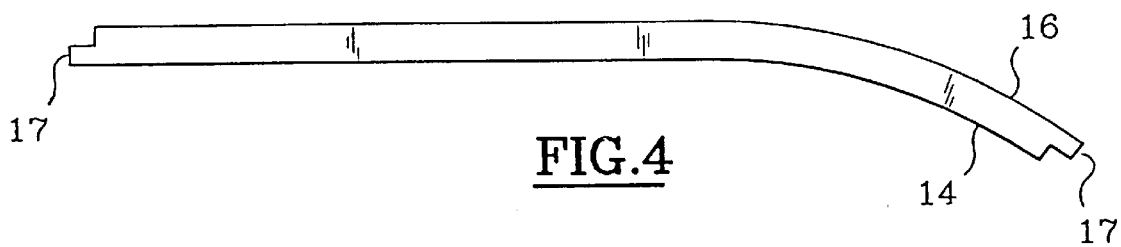
FIG. 4 is a diagram showing the strip of material in FIG. 3 after part of the strip has been deformed tangentially.
Figure 5:
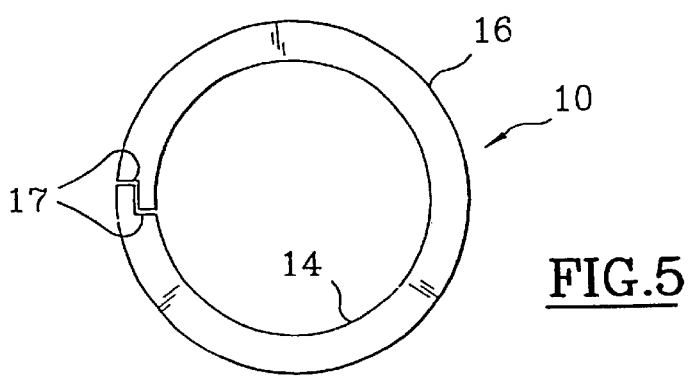
FIG. 5 is a diagrammatic view showing a friction liner, or a blank for a friction liner, made using the method of the invention.

With reference now to FIGS. 3 to 6, illustrating a method in accordance with the invention, a strip of friction material 12 is used here, which has a width l only slightly greater than, or even equal to, the final width of the final product, that is to say the annular friction liner 10 resulting from curing the circular blank seen in FIG. 5. This narrow strip of friction material has two parallel longitudinal edges 14 and 16. After the strip has been configured by deformation, as will be described below, the edge 14 constitutes the circular inner edge of the friction liner 10, and the edge 16 the circular outer edge of the liner.

The straight strip 12 is configured in the following way. The strip of friction material 12 shown in FIG. 3 is progressively deformed into a curve, so that it finally becomes a closed ring (FIG. 5). It will be noted that each of the ends 17 of the strip of material is formed with a rebate in this example. Accordingly, after the friction material has been deformed into a ring having abbutting ends 17, the complementary rebates may together to form a closed annular ring. Therefore, from a continuous strip of friction material of very much reduced width, an uncured blank for an annular friction liner is obtained without any significant wastage at all.

The operation of configuring the blank by deformation of the initial straight strip is made possible by the structure of the friction material before curing. In this state, the material is ductile, and the operation consists essentially in deforming it tangentially, that is to say drawing the material continuously in the longitudinal direction in the region of its outer edge 16. This is done, in the present example, by the apparatus shown diagrammatically in FIG. 6.

Figure 6:
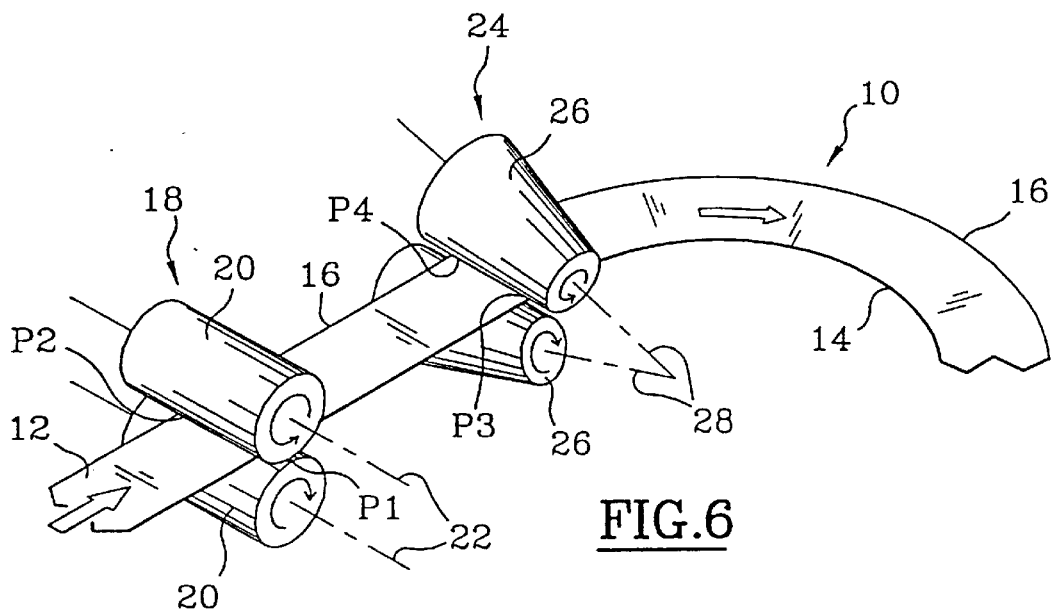
FIG. 6 is a diagrammatic perspective view showing the two main stations in an installation for carrying out the method of the invention.

Referring therefore to FIG. 6, the straight strip 12 of friction material, with its straight, parallel edges 14 and 16, is first passed through a first station 18 for longitudinal tensioning. First station 18 comprises two cylindrical rolls 20, the axes 22 of which are parallel to each other and lie in a common vertical plane which is at right angles to the plane in which the strip of material 12 is passed between the rolls 20. The rolls 20 are driven in opposite directions but at the same speed.

The first station 18 drives the strip 12 at a fully controlled constant forward velocity, with the edges 14 and 16 being maintained parallel to the forward direction.

The strip 12 is then passed through a second work station 24, which is the configuring station. As illustrated in FIG. 6, work station 24 may comprises two frusto-conical rolls 26 having axes 28, which intersect each other and which lie in a vertical plane at right angles to the plane in which the strip of material 12 is moved forward. The frusto-conical rolls 26 rotate in opposite directions and at the same speed, with the strip 12 passing between them.

The speeds of rotation and the dimensions of the cylindrical rolls 20 and the frusto-conical rolls 26 are such that the tangential velocities, at the instantaneous points of contact between the rolls concerned and the strip 12, are equal at the points P1, P2 and P3 in FIG. 6.

At the configuring station 24, on the other hand, due to the frusto-conical form of the rolls 26 the tangential velocity at the point P4 is significantly higher than the tangential velocity at the point P3. It will be understood that the difference between the velocities at the points P3 and P4 is proportional to the radius of the cone at the point concerned. By passing between the rolls 26 at the station 24, the strip 12 is thus drawn in the longitudinal direction by amounts which increase progressively across its width from its inner edge 14 to its outer edge 16. In this way it is drawn into the form of an annular ring as it leaves the station 24, as indicated in FIGS. 4 and 6.

Figure 7:
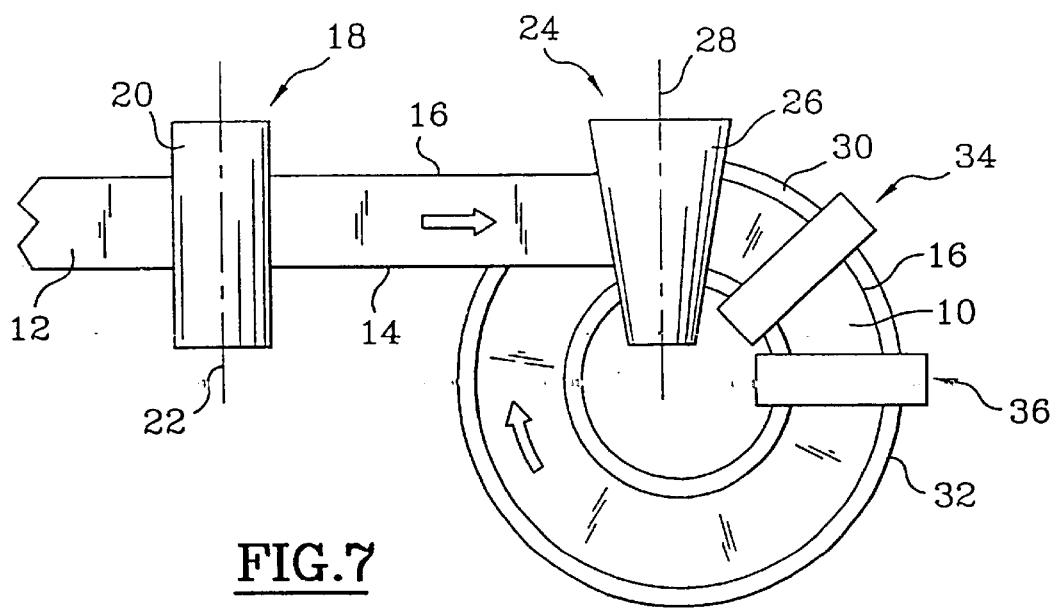
FIG. 7 is a top plan view showing diagrammatically more details of an installation for carrying out the method of the invention.

Reference is now made to FIG. 7, showing the apparatus more completely. The apparatus comprises, downstream of the second station 24, an annular reception channel 30, which may include suitable rollers or the like, for guiding the friction material into the annular shape to form the friction liner 10.

The apparatus also includes a trimming station 34, at which the inner circular edge 14 and the outer circular edge 16 are trimmed so as to give the annular liner 10 the precise width required.

The reception channel 30 includes a helical guide 32, which guides the material, downstream of the trimming station 34, through a sizing and joining station 36. When the strip 12, configured into an annular ring, has travelled through one complete circumference, its end is picked up by the station 36, in which the strip is sized by being trimmed to length as necessary in the transverse direction, and a spot of adhesive is applied to join the ends 17 of the strip together. The guide 32 is mounted pivotally so that it can be withdrawn to enable the annular blank for the friction liner 10 to be removed.

The reception channel 30 also includes, besides the helical guide 32, a corresponding inner guide shown in FIG. 7, and these guides can of course be made in a frusto-conical form so that flat frusto-conical annular friction liners can be made.

In the usual way, each blank is then placed in a mould, which, according to the particular equipment to which the friction liner is to be applied, may have a base which is either flat or frusto-conical, or of any other form, grooved or otherwise.

What is claimed is:

1. An apparatus for forming an annular friction liner from a straight strip of friction material comprising:

(a) a pair of adjacent conical rolls adapted to receive therebetween and configure the straight strip of friction material into the form of an annular ring, the adjacent conical rolls defining a common first plane therebetween and having intersecting longitudinal central axes defining a common second plane, the first plane and the second plane being perpendicular to each other, (b) a helical guide having a complementary annular form adapted to receive the annular ring of the configured friction material having passed between the pair of adjacent conical rolls, and (c) a device for trimming a length of the annular ring of the configured friction material to form the annular friction liner.

2. The apparatus according to claim 1, wherein the pair of conical rolls are frusto-conical rolls.

3. The apparatus according to claim 1, further including a pair of cylindrical rolls adapted to receive therebetween and advance the straight strip of frinction material toward the pair of adjacent conical rolls, the pair of cylindrical rolls having parallel axes defining a common third plane, the third plane and the first plane being perpendicular to each other.

4. The apparatus according to claim 3, wherein the conical rolls are frusto-conical rolls.

* * * * *